Feb. 27, 1934.                R. A. CARLSON                1,948,507
                            SPINDLE ADJUSTMENT
                            Filed July 9, 1931            2 Sheets-Sheet 1
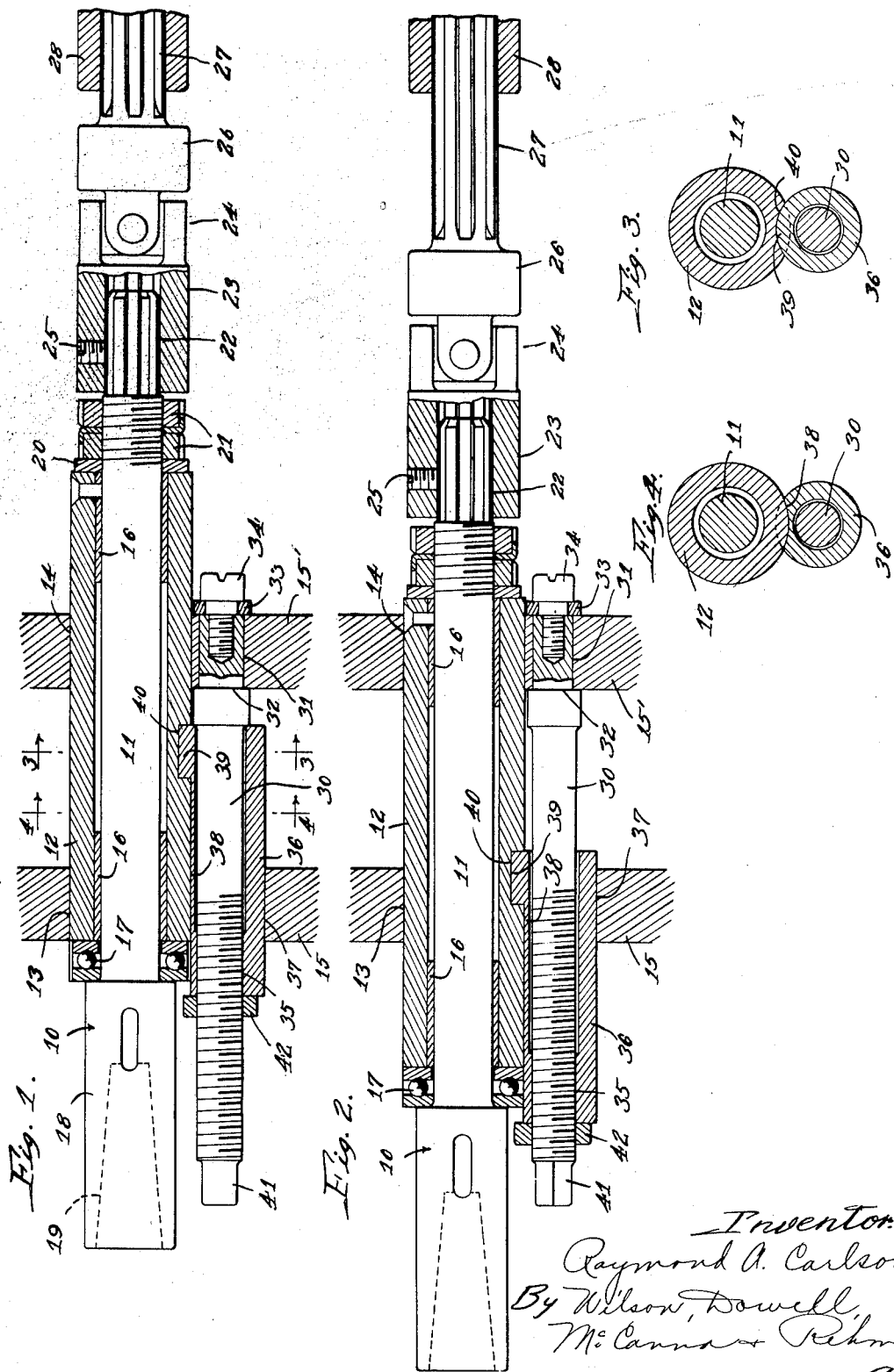

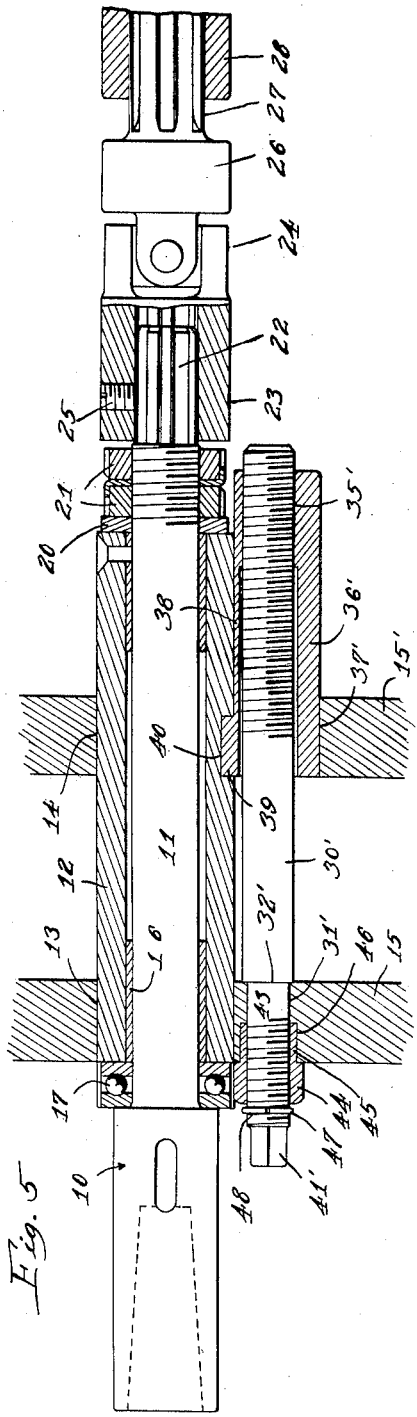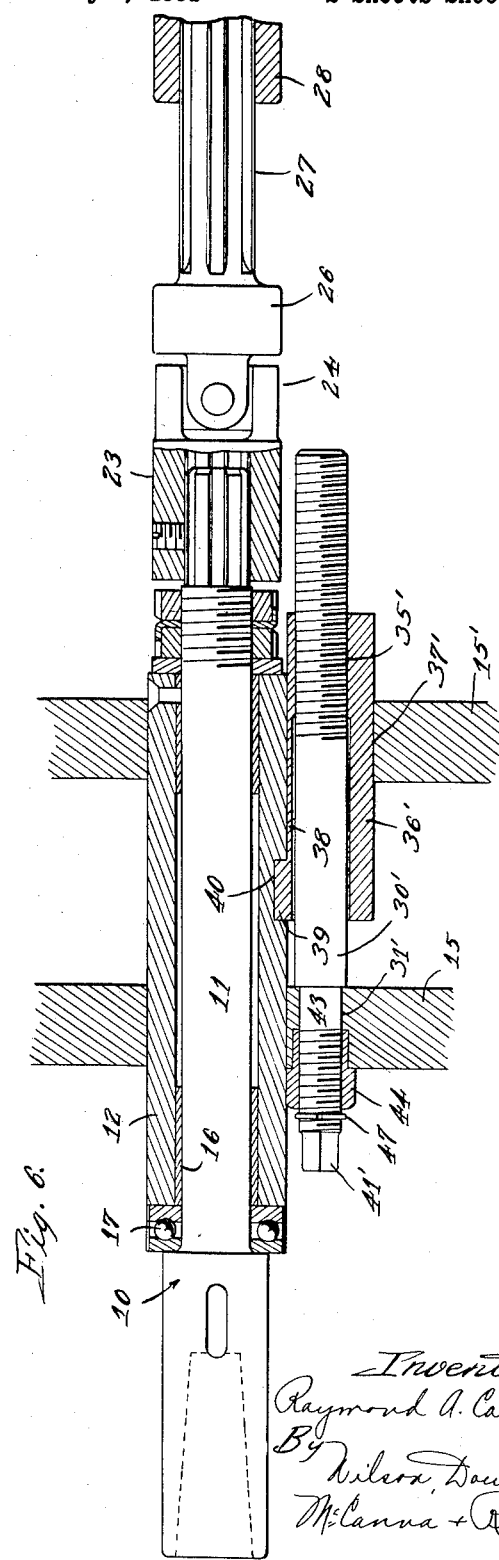

Patented Feb. 27, 1934

1,948,507

UNITED STATES PATENT OFFICE 1,948,507

SPINDLE ADJUSTMENT

Raymond A. Carlson, Rockford, Ill., assignor to Rockford Drilling Machine Co., Rockford, Ill., a corporation of Illinois Application July 9, 1931. Serial No. 549,587

4 Claims. (Cl. 77—24)

This invention relates to a spindle adjustment for a multiple spindle drilling machine or the like.

The principal object of my invention is to provide an adjustment of simpler and more compact and economical construction than has been available in the past, and one which permits of more accurate adjustment of the spindle, and with greater ease and facility.

The invention is illustrated in the accompanying drawings, in which—

Figure 1 is a longitudinal section through a spindle mounting for a multiple spindle drilling machine showing my improved adjustment;

Fig. 2 is a similar view indicating the manner of adjustment;

Figs. 3 and 4 are cross-sections taken on the correspondingly numbered lines of Figure 1, and Figs. 5 and 6 are views similar to Figs. 1 and 2, but showing a modified or alternative form of adjustment.

Similar reference numerals are applied to corresponding parts throughout the views.

Referring first to Figs. 1-4, the numeral 10 is applied to a spindle which is one of a set for a multiple spindle machine. Spindle adjustments such as are herein contemplated are most commonly required on multiple spindle drilling machines to compensate for wear of the ends of the drills carried by the spindles, but it should be understood that the invention is not to be regarded as necessarily limited to use on drilling machines, inasmuch as it is capable of use on a large variety of machine tools having the same or similar requirements so far as adjustment of spindles is concerned.

The shank 11 of the spindle 10 is received in a holder in the form of a sleeve 12 which is slidable in registering holes 13 and 14 in the outer and inner walls 15 and 15' of the face plate of the machine, which is ordinarily referred to as the cluster plate because of the projection therethrough of a cluster of spindles. The holder 12, as will soon appear, forms a part of the spindle adjusting means. The spindle has its shank 11 received in bushings 16 provided in the opposite ends of the holder 12, and an anti-friction thrust bearing 17 is interposed between the outer end of the holder 12 and the enlarged projecting end 18 of the spindle in which the socket 19 for the drill is provided. The spindle is held against end play in the holder 12 by means of a washer 20 and nuts 21 provided on the other end of the shank 11, the nuts 21 being set in the proper position and locked, allowing the spindle to turn freely in the holder. The inner end of the spindle projecting beyond the nuts 21 is splined, as appears at 22, for a driving connection with the one yoke 23 of a universal joint 24. A set screw 25 in the yoke 23 fastens the yoke to the spindle. The other yoke 26 of the universal joint has an elongated splined shank 27 fitting in the internally splined end of a sleeve 28 which is arranged to be driven in any suitable manner, as by means of a universal joint connection with a driven shaft. It should be clear from this description that outward adjustment of the spindle 10 with its holder 12 simply results in that much extension of the shank 27 from the sleeve 28, as indicated in Fig. 2.

An adjusting screw 30 is mounted for rotation in a hole 31 in the inner wall 15' of the face plate, and is held against endwise movement by engagement of the shoulder 32 on the screw with one side of the wall 15' and engagement of a washer 33, fastened to the end of the screw 30 by means of a screw 34, with the other side of the wall 15'. The screw projects through the outer wall 15 of the face plate to the extent illustrated, and threads at 35 in a sleeve 36 which has a sliding fit in a hole 37 in the outer wall 15 of the face plate. The sleeve 36 is, in other words, an elongated nut. Now, the holes 13 and 37 have their centers located so close together that the holes intersect, thus allowing the holder 12 and sleeve 36, which fit in said holes, to interfit with one another to hold said parts against turning and also provide an operating connection therebetween for endwise movement of the holder by endwise adjustment of the sleeve. The sleeve 36 is milled off on one side on a radius equal to the radius of the holder 12, lengthwise thereof from the outer end part-way to the inner end thereof, as at 38, to provide a channel to receive the side of the holder 12 therein (see Fig. 4). The interfitting of the parts in this way naturally prevents the sleeve 36 from turning. A lug 39 is defined on the inner end of the sleeve 36 at the termination of the longitudinal recess 38, and this lug is received in a recess 40 milled in the side of the holder 12 on a radius equal to the radius of the sleeve 36 (see Fig. 3). In this way the holder 12 is held against turning, and the parts 12 and 36 are moreover inter-connected so that endwise adjustment of the sleeve 36 results in endwise movement of the holder 12 to correspondingly adjust the spindle 10. Thus, when a wrench or other tool is applied on the squared outer end 41 of the screw 30 and the screw is turned, the sleeve 36 is adjusted endwise, because of the fact that it is held against turning, and its endwise movement is reflected in a corresponding endwise movement of the holder 12 and accordingly of the spindle 10. A lock nut 42 threading on the outer end of the screw 30 is arranged to be jammed against the end of the sleeve 36 to hold the screw in adjusted position and thereby maintain the spindle adjustment until a further adjustment is desired later, at which time the lock nut can, of course, be loosened to permit turning of the screw. The construction just described obviously permits of very accurate adjustment of the spindle, and in much less time than was possible with other spindle adjustments with which I am familiar. The construction is, furthermore, so compact that its use is permitted where the spindles are so closely spaced that most other forms of adjustments could not be used.

In Figs. 5 and 6 I have illustrated a similar spindle adjustment so constructed that only the squared end of the adjusting screw projects from the face plate. It will be seen by comparison with Figs. 1 and 2 that this construction is substantially the reverse of the other, the screw 30' being mounted for rotation in a hole 31' in the outer wall 15 of the face plate, and the sleeve 36' being slidably received in a hole 37' provided in the inner wall 15' of the face plate. The sleeve 36' cooperates with the holder 12 similarly as the sleeve 36 cooperates with holder 12 in the other construction, the holder 12 being received in the longitudinal recess 38 in the sleeve 36', and the lug 39 on the sleeve 36' being received in the recess 40 in the holder 12, whereby to hold the parts 12 and 36' against turning, and also provide an operating connection between said parts so that endwise adjustment of the sleeve 36' causes endwise movement of the holder 12. The inner end of the screw 30' threads in the inner end of the sleeve 36', as indicated at 35'. The screw 30' has a reduced outer end 43 fitting in the hole 31', the annular shoulder 32' on the screw thus defined having abutment with the inside of the outer wall 15 of the face plate to hold the screw against endwise movement outwardly. A nut 44 threads on the outer end of the screw and has a reduced cylindrical shank portion 45 fitting in a counterbore 46 in the hole 31'. A split ring 47 fits in a groove 48 provided in the projecting end of the screw 30' immediately adjacent the face of the nut 44. When the nut 44 is turned clockwise, it jams against the outer wall 15 of the face plate to prevent turning of the screw 30', but when the nut is given a quarter-turn or so in a counter-clockwise direction, it jams against the ring 47 and releases the screw for adjustment purposes. The outer end of the screw 30' is squared as at 41' for application of a wrench or other tool to permit turning thereof. The nut 44 when jammed against the ring 47 cooperates with the outside of the wall 15 to prevent endwise movement of the screw inwardly. This construction has the same advantages as the other, and, in addition, is of advantage from the standpoint that no part thereof is caused to project from the face plate to an extent that might be objectionable in doing certain kinds of work. Furthermore, with this construction, the adjusting means always projects from the face plate to the same extent, regardless of the position of adjustment of the spindle.

It is believed the foregoing description conveys a good understanding of all of the objects and advantages of my invention. The following claims have been drawn with a view to covering all legitimate modifications and adaptations coming within the spirit and scope of the invention.

I claim:

1. In a spindle adjustment, comprising a spindle projecting from a face plate, and an adjusting screw mounted for rotation on the face plate and held against endwise movement with respect thereto, said face plate having two circular holes provided therein intersecting one another, a sleeve of circular cross-section slidably received in the one hole and having said screw threading therein, and a holder for said spindle of circular cross-section slidably received in the other hole, said sleeve being provided with a longitudinal arcuate recess on one side thereof for detachable reception of a portion of the holder therein at the point of intersection of the holes, whereby to hold the sleeve against turning and cause endwise movement of the sleeve upon turning of the screw, and said holder having an arcuate recess provided in the side thereof for reception of an arcuate projection provided on the side of the sleeve whereby to prevent turning of the holder and provide an operating connection between the sleeve and holder to communicate endwise movement to the holder upon endwise movement of the sleeve.

2. A spindle adjustment as set forth in claim 1 including a lock nut threading on said screw and arranged to jam against the end of the sleeve whereby to lock the screw in adjusted position.

3. In a spindle adjustment, the combination with a face plate having inner and outer walls, a spindle projecting through the face plate, and a screw disposed parallel to the spindle and mounted for rotation in the inner wall of the face plate and projecting through the outer wall, the face plate having two circular holes provided in the outer wall thereof intersecting one another and concentric with the screw and spindle respectively, and another hole provided in the inner wall concentric with the spindle, of a sleeve of circular cross-section constituting a holder for the spindle slidably received in the registering holes provided in the inner and outer walls, and a sleeve slidably received in the remaining hole in the outer wall of the face plate and having said screw threading therein and projecting therethrough, said sleeves being conformed at the point of intersection of the holes to hold the second sleeve against turning, whereby to cause endwise movement of said second sleeve in the turning of said screw, and said sleeves being further conformed to provide for transmitting end thrust from the second sleeve to the first sleeve to adjust the spindle.

4. A spindle adjustment as set forth in claim 3 including a lock nut threading on said screw and arranged to jam against the end of the second sleeve whereby to lock the screw in adjusted position.

RAYMOND A. CARLSON.

CERTIFICATE OF CORRECTION.

Patent No. 1,948,507.  February 27, 1934.

RAYMOND A. CARLSON.

It is hereby certified that error appears in the printed specification of the above numbered patent requiring correction as follows: Page 2, line 128, claim 3, after "sleeve" insert of circular cross-section; and that the said Letters Patent should be read with this correction therein that the same may conform to the record of the case in the Patent Office.

Signed and sealed this 24th day of April, A. D. 1934.

Bryan M. Battey (Seal) Acting Commissioner of Patents.